United States Patent [19]

Matsubara

[11] 4,117,904

[45] Oct. 3, 1978

[54] VEHICLE SPEED CONTROL SYSTEM

[75] Inventor: Hiroshi Matsubara, Matsuyama, Japan

[73] Assignee: Diesel Kiki Co., Ltd., Tokyo, Japan

[21] Appl. No.: 820,155

[22] Filed: Jul. 29, 1977

[30] Foreign Application Priority Data

Aug. 5, 1976 [JP] Japan .................. 51-104075[U]

[51] Int. Cl.² .......................................... B60K 31/00
[52] U.S. Cl. ...................................... 180/108; 123/102
[58] Field of Search .......................... 180/105 R, 108; 123/102, 103 R

[56] References Cited

U.S. PATENT DOCUMENTS

| | | | |
|---|---|---|---|
| 3,183,993 | 5/1965 | Parker | 123/103 R X |
| 3,340,952 | 9/1967 | Day | 180/108 |
| 3,441,104 | 4/1969 | Hagler | 180/108 |
| 3,635,306 | 1/1972 | Davis | 123/102 X |
| 3,774,715 | 11/1973 | Matsubara | 123/102 X |

*Primary Examiner*—Joseph F. Peters, Jr.
*Assistant Examiner*—Terrance L. Siemens
*Attorney, Agent, or Firm*—David G. Alexander

[57] ABSTRACT

A diaphragm assembly is linked to an engine throttle valve to control vehicle speed in accordance with applied fluid pressure. A speed sensor angularly positions a shaft in accordance with vehicle speed. Fluid pressure is modulated in accordance with the shaft position to control the diaphragm assembly. Momentarily depressing a button actuates a clutch assembly comprising a friction disc, a bifurcated spring and a tapered cam so that the vehicle speed is maintained at the speed the vehicle is travelling at the time the button is depressed.

5 Claims, 7 Drawing Figures

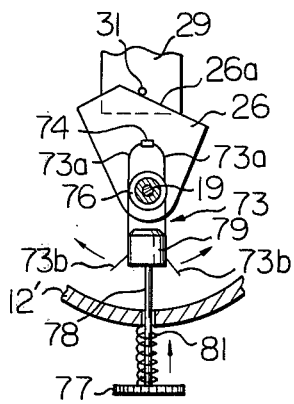
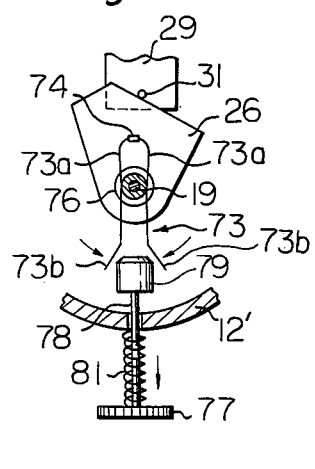
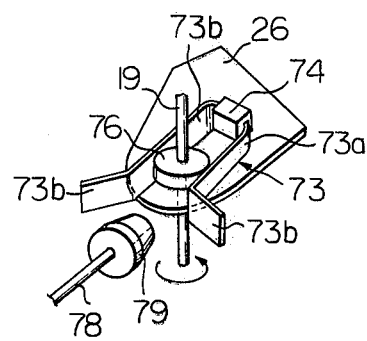
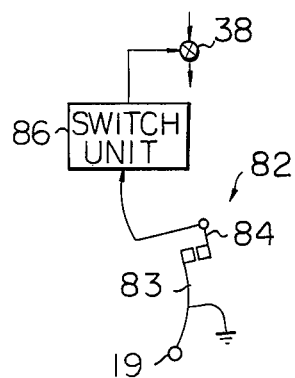
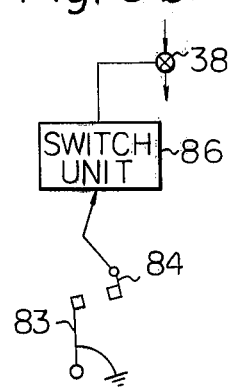

VEHICLE SPEED CONTROL SYSTEM

BACKGROUND OF THE INVENTION

The present invention relates to a speed control system for an automotive vehicle or the like.

A control system to which the present invention constitutes a novel improvement is disclosed in U.S. Pat. No. 3,774,715 which is assigned to the same assignee as the present invention. The shaft of a speedometer type speed sensor is angularly positioned in accordance with vehicle speed. A control plate fixed to the shaft modulates an air stream in a modulator unit, the modulated air pressure being applied to a diaphragm which is connected to the vehicle throttle valve to control the vehicle speed. The desired vehicle speed is set by adjusting the pre-load of a spring which applies a restoring force to the shaft. Whereas the system operates quite well once the desired speed is set, a drawback is encountered in that precise setting of the desired speed by means of spring tension is difficult to achieve in practical application.

A recent improvement to the system comprises means for angularly positioning the assembly which forms the air stream relative to the plate for setting the desired vehicle speed. Although precise setting is accomplished by this improvement, another drawback is introduced in the form of substantially increased complexity of construction and manufacturing cost.

U.S. Pat. No. 3,441,104 discloses a mechanism comprising a U-shaped spring, a friction disc and cam which enable speed setting in a different but effective manner by momentarily actuating the cam when the vehicle is moving at the desired speed. However, the mechanism as disclosed in this latter patent converts angular movement into linear movement and involves a radial lost motion connection. It is therefore not applicable as disclosed to the present type of system in which angular movement must be transmitted rather than converted.

SUMMARY OF THE INVENTION

In accordance with the present invention, a diaphragm assembly in linked to an engine throttle valve or the like to control vehicle speed in accordance with applied fluid pressure. A speed sensor which may be integral with a speedometer angularly positions a shaft in correspondence with vehicle speed. A fluid control plate rotatable with the shaft modulates a fluid stream and thereby fluid pressure which is applied to the diaphragm assembly to maintain the vehicle speed at a desired value irrespective of variations in load. The plate is rotatably mounted on the shaft and has a bifurcated spring fixed thereto which normally embracingly engages a friction disc fixed to the shaft thereby connecting the plate to the shaft. A cam may be momentarily moved into engagement to spread the bifurcations of the spring and thereby disengage the plate from the shaft. The cam also moves the spring and plate to an angular center or zero speed error position. Retracting the cam to release the spring sets the desired value of speed which is the instantaneous value of vehicle speed at the instant the spring is released. A low speed cutout switch returns the vehicle to manual control when the vehicle speed is below a predetermined value.

It is an object of the present invention to provide a vehicle speed control system which is effective in operation yet simplified in construction compared to the prior art.

It is another object of the present invention to provide a vehicle speed control system comprising improved means for setting the desired vehicle speed into the system.

It is another object of the present invention to provide a vehicle speed control system in which the desired vehicle speed can be set into the system merely by pressing a button when the vehicle is travelling at the desired speed.

It is another object of the present invention to provide a vehicle speed control system comprising an improved means for setting the desired vehicle speed having a friction disc, U-shaped spring and actuating cam which is adapted in a novel and unique manner to eliminate radial lost motion and transmit angular movement.

It is another object of the present invention to provide a generally improved vehicle speed control system.

Other objects, together with the foregoing, are attained in the embodiment described in the following description and illustrated in the accompanying drawing.

BRIEF DESCRIPTION OF THE DRAWING

FIG. 3 is a fragmentary schematic view showing important parts of a modular unit in a connected status for automatic vehicle speed control;

FIG. 4 is similar to FIG. 3 but shows the parts in a disconnected status for setting the desired vehicle speed;

FIG. 5 is a perspective view of the parts shown in FIGS. 3 and 4;

FIG. 6a is a schematic view of a low speed cutout switch as closed during low speed operation; and FIG. 6b is similar to FIG. 6a but shows the cutout switch as open during high speed operation.

DESCRIPTION OF THE PREFERRED EMBODIMENT

While the vehicle speed control system of the invention is susceptible of numerous physical embodiments, depending upon the environment and requirements of use, substantial numbers of the herein shown and described embodiment have been made, tested and used, and all have performed in an eminently satisfactory manner.

Figure 1:
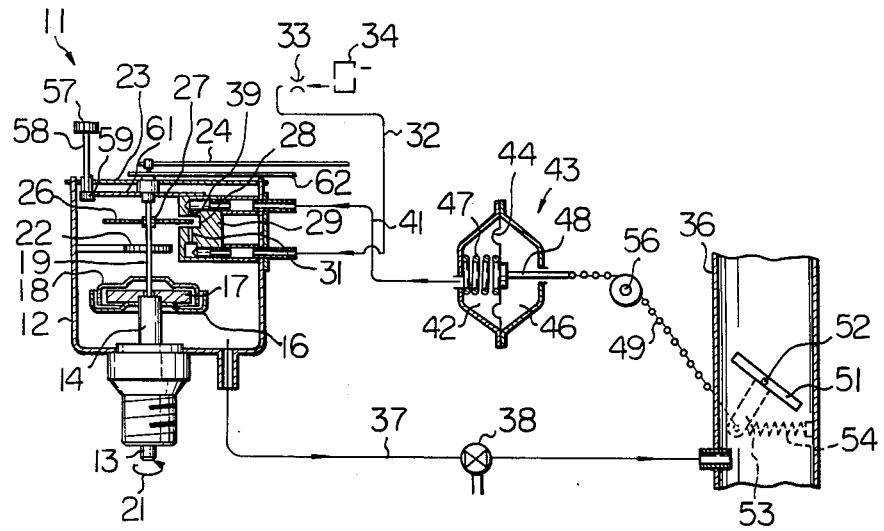
FIG. 1 is a sectional schematic view of a prior art vehicle speed control system.
Figure 2:
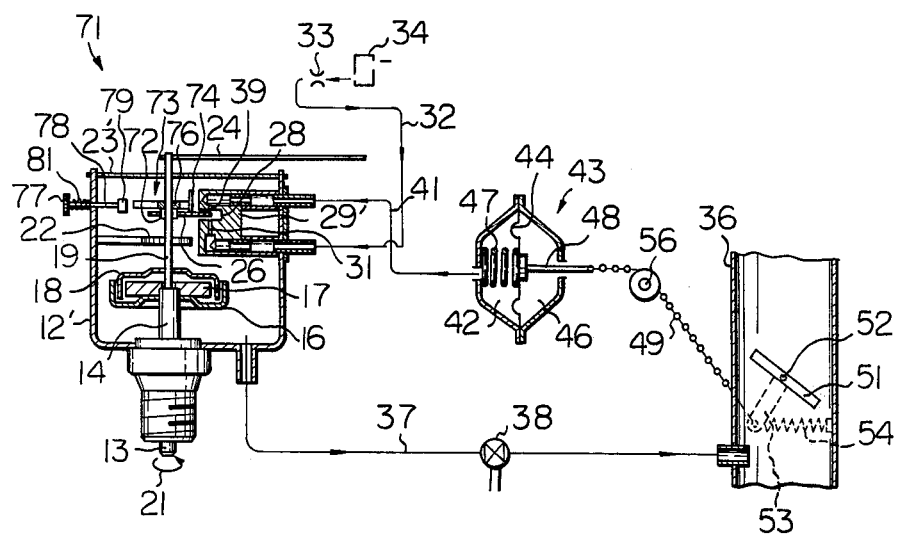
FIG. 2 is similar to FIG. 1 but shows a vehicle speed control system embodying the present invention.

Referring now to FIG. 1 of the drawings, a prior art vehicle speed control system of the type mentioned hereinabove is generally designated by the reference numeral 11 and comprises a speedometer casing 12. A speedometer cable 13 is operatively connected to the drive train of a motor vehicle such as an automobile, although not shown, in such a manner that the speedometer cable rotates at a speed proportional to the vehicle speed. The speedometer cable 13 is connected at its upper end to an input shaft 14 which is rotatably supported by the casing 12. A magnet support cup 16 is fixed to the input shaft 14 and supports a magnet 17 for unitary rotation. A ferromagnetic cup 18 is fixed to an output shaft 19 which is rotatably supported by the casing 12. The cup 18 is configured so as to surround the periphery of the magnet 17. Whereas the input shaft 14, cup 16 and magnet 17 are rotated in the direction of an arrow 21 upon movement of the vehicle, a torsion spring 22 connected between the casing 12 and output shaft 19 urges the output shaft 19 in the opposite direction.

The casing 12 is generally cup shaped and opens upwardly as viewed in FIG. 1. A cap plate 23 seals the top of the casing 12, with the output shaft 19 rotatably extending through the plate 23. A speedometer pointer 24 is fixed to the upper end of the output shaft 19. The face of the plate 23 below the pointer 24 is calibrated to indicate the vehicle speed in miles per hour, kilometers per hour or the like.

In operation, the input shaft 14 and magnet 17 are rotated at a speed proportional to vehicle speed. The magnet 17 induces eddy currents in the cup 18 which in turn produce magnetic fields which interact with the field of the magnet 17. As a net result, the cup 18 is urged to rotate with a force corresponding to the vehicle speed. However, the spring 22 resists rotation of the output shaft 19 in accordance with Hooke's Law. The output shaft 19 thereby attains an angular equilibrium position at which the magnetic force equals the spring force. Thus, the output shaft 19 and pointer 24 are angularly positioned in accordance with vehicle speed which is indicated by the position of the pointer 24 relative to the graduations on the face of the plate 23. The elements and operation described thus far constitute a known speedometer.

Further fixed to the output shaft 19 is a control plate 26 having a shape best seen in FIGS. 3 to 5. In the prior art system 11 of FIG. 1, the control plate 26 is fixedly mounted on the shaft 19 by a sleeve 27. The control plate 26 is formed with a control edge 26a which intrudes into a gap 28 of a modulator assembly 29. An inlet jet 31 of the modulator assembly 29 leads to the atomosphere through an inlet conduit 32, a flow restriction 33 and an air filter 34. The gap 28 communicates with the interior of the casing 12 which is connected to a carburetor 36 of the vehicle through an outlet conduit 37 and a solenoid valve 38. Axially facing the inlet jet 31 across the gap 28 is an outlet jet 39 which leads through a control conduit 41 to a sealed spring chamber 42 of a diaphragm unit 43. A diaphragm 44 partitions the unit 43 into the spring chamber 42 and a pressure chamber 46 which is open to the atmosphere. A compression spring 47 provided in the spring chamber 42 urges the diaphragm 44 rightwardly.

A rod 48 is connected at its left end to the center of the diaphragm 44 and at its right end to a chain or cable 49. A throttle valve 51 in the form of a circular or oval plate is rotatably mounted in the carburetor 36 about a shaft 52. An arm 53 extends downwardly from the throttle plate 51. A tension spring 54 connected between the wall of the carburetor 36 and the lower end of the arm 53 urges the arm 53 and throttle plate 51 counterclockwise so as to close the throat of the carburetor 36. The cable 49 is trained around a roller 56 and connected to the end of the arm 53. Although not shown, a conventional throttle linkage actuated by an accelerator pedal is connected to the throttle plate 51 in parallel with the elements shown.

The system 11 is designed to control the vehicle to travel at a desired speed through control of the throttle plate 51. Assuming that the vehicle is moving at the desired speed, the control plate 26 partially covers the inlet jet 31 of the modulator assembly 29 as shown in FIG. 3. This is a zero speed error or center angular position of the plate 26. The fluid pressure in the system, in this case air pressure, drops from atmospheric to the vacuum prevelant in the carburetor 36 below the throttle plate 51 progressively in the flow restriction 33, gap 28 and casing 12. With the plate 26 fully covering the inlet jet 31, the pressure at the outlet jet 39 and thereby in the spring chamber 42 is minimum. With the plate 26 fully uncovering the inlet jet 31 the pressure at the outlet jet 39 and in the spring chamber 42 is maximum. In the center position in which the plate 26 partially covers the inlet jet 31 the pressure at the outlet jet 39 and spring chamber is intermediate. It will be seen that the control plate 26 controls a fluid stream in the gap 28 by variably blocking the same.

If the vehicle attempts to speed up above the desired speed due to a reduction in load, the plate 26 rotates counterclockwise in FIG. 3 to further uncover the inlet jet 31. This causes the pressure in the outlet jet 39 and spring chamber 42 to increase. The higher pressure in the spring chamber 42 allows the spring 47 to move the diaphragm 44 further rightwardly. The movement is transmitted to the arm 53 through the cable 49 allowing the spring 54 to rotate the throttle plate 51 counterclockwise to further block the throat of the carburetor 36 and reduce the speed of the vehicle to the desired value. The opposite action occurs when the vehicle speed drops due to an increase in load.

The system 11 may be de-energized to allow manual speed control merely by closing the solenoid valve 38. Although not shown, a manual switch for closing the solenoid valve 38 is provided in addition to various switches to close the valve 38 when the vehicle speed is too high or too low or when the vehicle brake or clutch pedals are depressed. With the solenoid valve 38 closed, the pressure in the casing 12 rises to atmospheric. The pressure in the spring chamber 42 also rises to atmospheric allowing the spring 54 to move the throttle plate 51 to the closed position. Depressing the accelerator pedal (not shown) allows the throttle plate 51 to be moved to an open position since the cable 49 will slacken. Although the system 11 is shown and described as being connected to control a carburetor, it may of course be adapted to a vehicle having a fuel injection system.

In order to set the speed at which vehicle is desired to be driven, the operator turns a knob 57 which is provided at the upper end of a shaft 58 which is rotatably supported by the cap plate 23. A pinion gear 59 is fixed to the lower end of the shaft 58. A positioning gear 61 is rotatably supported about the shaft 19 and meshes with the pinion gear 59. The modulator assembly 29 is not fixed to the casing 12 but is attached to and supported by the positioning gear 61. A set speed pointer 62 is fixed to the gear 61 for integral rotation below the vehicle speed pointer 24. By this arrangement, rotation of the knob 57 causes the modulator assembly 29 to move relative to the plate 26 in an arcuate manner about the axis of the shaft 19.

The operator rotates the knob 57 until the pointer 62 indicates the desired vehicle speed with relation to the calibrations on the plate 23. This rotates the modulator assembly 29 to a position such that when the vehicle is moving at the desired speed the control plate 26 will attain the center position illustrated in FIG. 3 relative to the modulator assembly 29.

Whereas the prior art system illustrated in FIG. 1 allows precise adjustment of the desired or set speed for the vehicle, it has various disadvantages, one being that the vehicle operator has to rotate the knob 57 to position the pointer 62 to indicate the desired speed while operating the vehicle, thus constituting a safety hazard. In addition, the mechanism comprising the knob 57, shaft 58, gears 59 and 61, pointer 62 and especially the movable modulator assembly 29 is relatively complicated and expensive to manufacture. The modulator assembly 29 must be movable but also communicate with the conduits 32 and 41, thus requiring a complicated sealing arrangement between the modulator assembly 29 and the casing 12.

These drawbacks are overcome present invention which is illustrated in FIGS. 2 to 6b. A present vehicle speed control system 71 operates in the same general manner as the prior art system 11 except as will be described in detail hereinbelow. Like elements are designated by the same reference numerals and elements which are essentially similar in function but modified in configuration are designated by the same reference numerals primed.

In the present system 71 a modulator assembly 29' is fixedly mounted in casing 12' and the knob 57, shaft 58, gear 59 and 61 and pointer 62 are eliminated. Furthermore, the control plate 26 is not fixed to the output shaft 19 but is rotatably supported thereon by means of a bearing 72. A closed end of a U-shaped or bifurcated spring 73 is fixed to the upper surface of the plate 26 by means of a clamp 74. Bifurcations of the spring 73 designated as 73a are parallel and normally engage in a diametrically opposed manner with the periphery of a friction disc 76 which is fixed to the shaft 19 above the bearing 72. In other words, when released the bifurcations 73a of the spring 73 embrace and resiliently frictionally engage with the friction disc 76. In this manner, the plate 26 is connected to the shaft 19 for unitary rotation through the spring 73 and friction disc 76. Thus connected, the system 71 controls the vehicle speed in the manner described herein above with reference to the system 11.

To set the vehicle speed to the desired value, the operator accelerates or decelerates the vehicle under manual control until the vehicle is actually moving at the desired speed. The operator then momentarily pushes a button 77 which is fixed to the outer end of a rod 78 which is slidably supported by the casing 12'. A cam 79 having a tapered end is fixed to the inner end of the rod 78. Pushing the button 77 causes the cam 79 to enter the open end of the spring 73 and engage with the bifurcations 73a. The diameter of the cam 79 is suitably selected to be larger than the distance between the bifurcations 73a with the bifurcations 73a in engagement with the disc 76. Thus, as the cam 79 is pushed into the open end of the spring 73b it spreads the bifurcations 73a away from each other and causes the bifurcations 73a to disengage from and release the disc 76. Since the bifurcations 73a are parallel the cam 79 forces the spring 73 and thereby the control plate 26 to the center position as the cam 79 moves deeper into the spring 73. This action causes the plate 26 to attain the center angular position or zero speed error position when the vehicle is actually traveling at the desired speed. The end portions of the bifurcations 73a are bent outwardly as indicated at 73b to facilitate insertion of the cam 79. The spring 73, disc 76 and cam 79 constitute a clutch (not designated).

Releasing the button 77 allows the cam 79 to be pulled out of the spring 73 by a compression spring 81 which yieldably holds the button 77, rod 78 and cam 79 in a normal position disengaged from the spring 73. The cam 79 is pulled straight out of the spring 73 thereby releasing the bifurcations 73a to again frictionally engage with the disc 76. The compression spring 81 coaxially surrounds the rod 78 between the casing 12' and the button 77. With the spring 73 again engaging the disc 76 the control plate 26 is connected to the shaft 19 through the spring 73 and disc 76 to maintain the vehicle speed at the desired value at which the vehicle was actually moving at the time the button 77 was released.

FIGS. 6a and 6b illustrate a low speed cutout switch 82 which comprises an elongated flexible contact 83 attached to the shaft 19 for unitary rotation. The contact 83 is grounded and is engageable with a fixed contact 84. FIG. 6a shows the switch 82 as closed when the vehicle speed is below a predetermined value such as 35 kilometers per hour. The contact 83 engages with the contact 84 and bends to allow overtravel of the shaft 19 to very low vehicle speeds. As shown in FIG. 6b, counterclockwise rotation of the shaft 19 as the vehicle speed exceeds the predetermined value causes the contact 83 to disengage from the contact 84.

The contact 84 is connected to a switch unit 86 which controls the solenoid valve 38. When the vehicle speed is below the predetermined value, a suitable circuit (not shown) in the switch unit 86 is grounded through the switch 82 and closes the valve 38, thereby returning the vehicle to manual speed control. The switch 82 prevents overspeeding and possible destruction of the vehicle engine under conditions such as when the vehicle clutch is disconnected or the transmission is in low gear and the vehicle is traveling at low speed. Although the cam 79 is illustrated as being actuated manually through the button 77 to set the desired vehicle speed, an electromagnetic solenoid (not shown) may be provided to actuate the cam 79 in response to closure of an electric switch.

In summary, it will be seen that the present invention provides a vehicle speed control system of improved but simplified construction which allows the desired vehicle speed to be set accurately by merely pressing a button when the vehicle is actually moving at the desired speed. Various modifications will become possible for those skilled in the art after receiving the teachings of the present disclosure without departing from the scope thereof.

What is claimed is:

1. A vehicle speed control system comprising:
   actuator means for controlling a vehicle speed in accordance with applied fluid pressure;
   vehicle speed sensing means having a shaft, an angular position of the shaft corresponding to vehicle speed; and
   modulator means connected between a fluid pressure source and the actuator means for modulating fluid pressure in accordance with the angular position of the shaft, the modulator means comprising:
   means for forming a fluid stream;
   a fluid control plate rotatably supported by the shaft for variably blocking the fluid stream in accordance with an angular position of the plate;
   a friction disc fixed to the shaft;
   a bifurcated spring fixed at a closed end thereof to the plate and having bifurcations normally frictionally engaging in substantial diametric opposition with a periphery of the disc thereby connecting the plate to the disc for unitary rotation; and
   a cam movable into engagement with the spring at an open end thereof for moving the bifurcations away from each other and out of engagement with the disc to disconnect the plate from the disc, the cam moving the spring and disc to an angular center position.

2. A control system as in claim 1, in which the bifurcations are parallel, the cam having a tapered end for engagement with the bifurcations.

3. A control system as in claim 2, in which portions of the bifurcations at said open end thereof are bent outwardly.

4. A control system as in claim 1, further comprising a low speed cutout switch having a first contact mounted on the shaft for unitary rotation and a second fixed contact, the first contact engaging with the second contact when the vehicle speed is below a predetermined value for deenergizing the control system.

5. A control system as in claim 1, in which the actuator means comprises a diaphragm assembly.

* * * * *